United States Patent [19]
Benatti

[11] 3,909,062
[45] Sept. 30, 1975

[54] SELF-TIGHTENING TOOL CHUCK WITH A STOP MEMBER ADAPTED TO BE AXIALLY DISPLACED BY MEANS OF SCREWS

[75] Inventor: Edmo Benatti, Bancole, Italy

[73] Assignee: Firma Franken Fabrik fur Prazisionswerkzeuge, und Prazisionsteile Richard Voigt Nachf, Ruckersdorf, Germany

[22] Filed: Feb. 5, 1974

[21] Appl. No.: 439,942

[30] Foreign Application Priority Data
Feb. 7, 1973 Germany............................ 2305768

[52] U.S. Cl.................... 279/47; 279/1 S; 279/51
[51] Int. Cl.²......................................... B23B 31/20
[58] Field of Search............ 279/1 S, 43, 47, 50, 57, 279/42, 48, 51, 52, 58, 59

[56] References Cited
UNITED STATES PATENTS
3,547,454    12/1970    Benjamin............................. 279/47
3,677,560    7/1972    Clarkson.............................. 279/1 S

FOREIGN PATENTS OR APPLICATIONS
1,904,536    8/1970    Germany............................. 279/1 S
217,345    9/1958    Australia............................. 279/59

*Primary Examiner*—Gil Weidenfeld
*Attorney, Agent, or Firm*—Holman & Stern

[57] ABSTRACT

A self-tightening tool chuck for a machine tool comprising a chuck member having a bore to one end of the member and the other end is adapted for coaxial connection of the chuck member to a machine shaft. A stop member and a tool housing are axially adjustable in the bore. The tool housing has an internal thread for receiving a tool and the tool and housing are clampable to the chuck member by means of a ring nut mounted on the chuck member. The positioning of the stop member is defined by a radially adjustable locating screw which has a frusto-conical bearing surface cooperable with a bearing surface on the stop member inclined at an acute angle to the axis of the chuck member.

5 Claims, 4 Drawing Figures

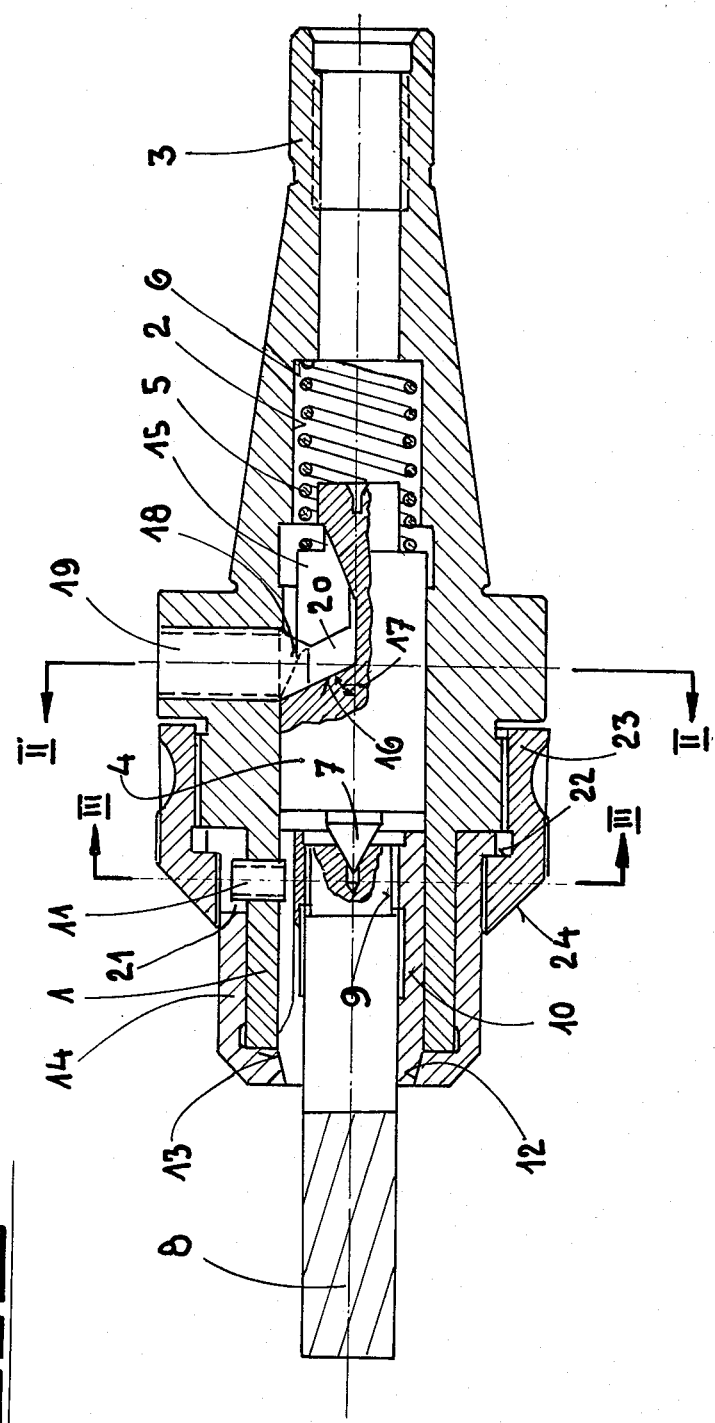

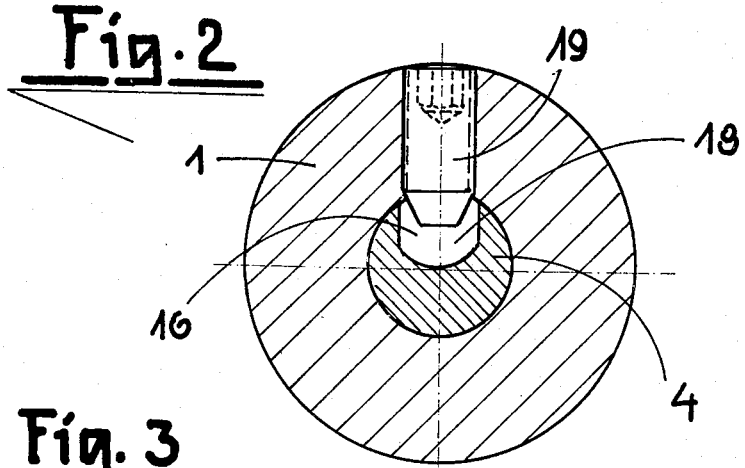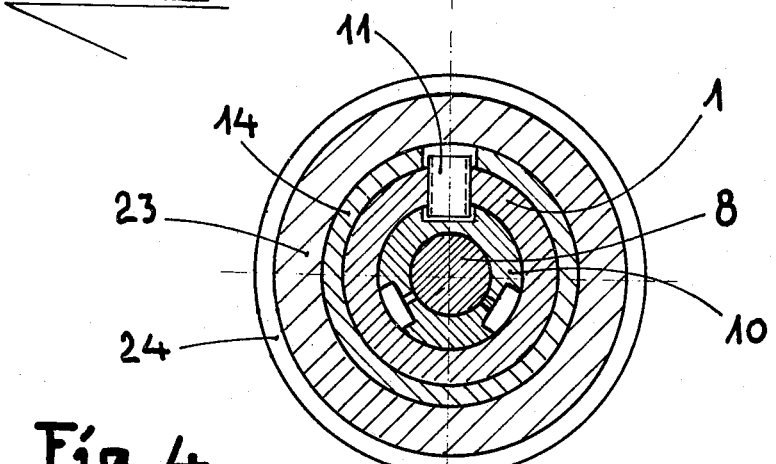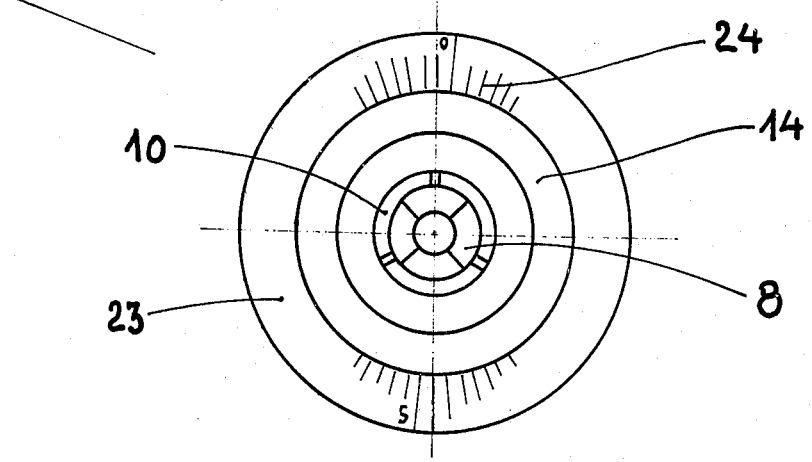

SELF-TIGHTENING TOOL CHUCK WITH A STOP MEMBER ADAPTED TO BE AXIALLY DISPLACED BY MEANS OF SCREWS

BACKGROUND OF THE INVENTION

The present invention relates to self-tightening tool chucks for machine tools of the type having a cylindrical shaft and thread, especially a milling tool, comprising a chuck member with one end adapted to be mounted on a machine spindle and a recess opening to the other end, a stop member adapted to be displaced in the said recess along the centre axis, against which stop member a screw screwed radially into the chuck member abuts at bearing surfaces, a housing mounted in the recess having an internal thread for receiving the tool which is clamped by a ring nut adapted to be screwed externally onto the chuck member.

In addition to tool chucks (Swiss Patent Specification No. 337,057), whose centre point or sphere is not axially displaceable, tool chucks which have an axially displaceable stop member bearing a centre point are also known (U.K. Patent Specification No. 848,563). This type of tool chuck is particularly used in numerically controlled machines to regulate the tool length extending from the chuck, in case the total length of the tool has changed due e.g. to subsequent machining. Such tool chucks are not only advantageously applied to numerically controlled machines but also in other cases when it is necessary to be able to adjust the length of the tool extending from the tool chuck.

In a known tool chuck similar to the type mentioned initially but which is not self-tightening, a screw is provided coaxially behind the stop member which screw is rotatable above the end of the chuck member which serves as a connection with the machine spindle, in order to displace the stop member in the axial direction. The end surface of a conventionally designed set screw, screwed radially into the chuck member, can be screwed against a cylindrical bearing surface of the stop member to prevent the stop member, which has been brought into position, riding over the axially mounted adjusting screw in the direction of the centre axis. Loosened ring nuts are used to adjust the stop member, either the housing being axially displaced with the tool and then secured by set screws or the tool being moved axially in the housing by screws.

The disadvantage is that the known tool chuck must be removed from the machine spindle to adjust the position of the stop member. Another known self-tightening tool chuck (German Specification No. 2,053,272) does not have this disadvantage, in that an adjusting ring is adapted to be screwed on the stop member and is supported on an arm of the recess of the chuck member and is accessible through a side aperture in the chuck member. The relatively large aperture weakens the chuck member and requires special steps to be taken when producing the tool chuck. More particularly, the adjusting ring, on rotation, is in friction contact with the chuck member. Therefore, when the adjusting ring rotates in the rotational direction of the machine spindle, this tends to rotate with it, which makes it difficult to displace the stop member. The friction between the adjusting ring and the chuck member is particularly great when the tool is somewhat clamped by the ring nut, so that a strong force must be applied to twist the adjusting ring, such force meets no reaction at the machine spindle and the machine spindle rotates in sympathy when the adjusting ring is being twisted particularly when the tool is to be freed by moving the stop member back out of its locked position, which is the case with so-called self-tightening tool chucks.

SUMMARY OF THE INVENTION

It is an object of the invention to produce a tool chuck of the type mentioned initially in which not only is the stop member adjustable externally without the whole chuck needing to be removed from the machine spindle but also the member to be twisted in order to displace the stop member is not mounted coaxially to the centre shaft of the chuck, to prevent the machine spindle rotating on screwing this member. The invention proposes a tool chuck of the type mentioned initially which is characterised in that the bearing surface of the radial screw is frusto conical and the bearing surface of the stop member is designed to extend at an acute angle to the centre axis.

In a tool chuck according to the invention the stop member is displaced by turning the screw arranged perpendicular to the centre axis. The screw is directly accessible from the exterior. The screw is not rotated about an axis parallel to the axis of the machine spindle, thus the machine spindle cannot rotate in sympathy. Self-clamping of the tool may be provided for by means of slits and cones on the housing. In self-clamping chucks of this type, the housing is displaced against a further cone by screwing in the tool in such a way that the housing clamps the tool more tightly.

It is possible to displace and lock a tool by means of a side screw which acts against an oblique surface of a cylindrical part of a stop member. Turning the screw and the subsequent displacement against the oblique surface causes displacement of the stop member and locking of the tool. Tightening and loosening the tool may be effected not by the ring nut but by means of the screw which displaces the stop member without the machine spindle being able to move with it. It is particularly useful for the ring nut adapted to be screwed to be fitted with a scale showing the degree of displacement of the stop member. When the tool is screwed right into the slit housing, the ring nut is adjusted to conform to the desired position of the stop member. The screw with the conical sleeve surface is then screwed in and the tool thus tightened in position.

In an embodiment of the invention the stop member is held by the completely screwed-in screw in its rearmost position, its initial position, the member holds a compression screw compressed. If the screw is unscrewed to a certain extent, the compression spring can push the stop member forwards. The bearing surface of the stop member is inclined towards the rear and occupies a position behind the screw, seen in the direction of the centre shaft.

The accompanying drawings illustrates a preferred and non-limitation embodiment of the invention.

In the drawings:

FIG. 1 is a longitudinal section through a tool chuck with a clamped tool;

FIG. 2 is a section along line II—II of FIG. 1;

FIG. 3 is a section along line III—III in FIG. 1; and

FIG. 4 is a front view of the tool chuck according to FIG. 1.

The tool chuck according to the drawing has a chuck member 1 with a full-length recess or bore 2 of circular section. The rear end 3 of the chuck member 1 is suitably designed to be attached to a machine spindle. A stop member 4 having a circular section is provided in the bore 2, an end of a spiral spring 5 is supported on the rear end of the stop member, the other end of the spring engaging on a radial shoulder 6. The stop member has a central point 7 on the end opposite the spring, to engage a tool 8, particularly a milling cutter. The tool is screwed by means of a thread 9 in an internal thread at the base of a tool or slit housing 10, which is pushed into the front part of the bore 2. A set screw 11 is screwed in the radial direction through the chuck member, said screw projects into a longitudinal groove on the slit housing 10 and secures this against rotation. The front end part of the slit housing 10 projects out of the bore 2 with a forwardly tapering exterior cone 12, against which an interior cone 13 of a sleeve or bush 14 abuts, said bush being mounted externally onto the chuck member 1.

The stop member 4 has a groove 15 which forms a bearing surface 16 approximately in the centre of the stop member which is inclined forwards and forms an angle 17 of less than 90° with the centre axis. Seen in the direction of the centre axis, a frusto conical surface 18 of an end part of a locating screw 19 which projects into the groove 15 is provided behind the bearing surface 16 of the stop member 4, said screw being screwed radially into the chuck member 1. The bearing surface 16 is formed by a channel-shaped groove 20 having an arched section, which to a certain extent surrounds the conical end surface 18. The upper end of the locating screw 19 (see FIG. 2) has a recess with an angular section into which a tool to turn the screw may be fitted. The bush 14 is slidable on the chuck member 1 and is secured against rotation by the set screw 11 projecting upwards into a recess 21 (see FIG. 3). The rear end of the bush 14 has an annular collar forming a radial wall which engages shoulder 22 on a ring nut 23 screwed onto the chuck member 1. The ring nut 23 has a forward sharply angled surface on which a scale 24 is provided to indicate the degree of displacement of the stop member from a datum position. The bush 14 is accurately ground so that accurate roundness on the external cone 12 is achieved, this cannot be achieved if the bush 14 is adapted to be screwed on.

Assembling, adjusting the position and locking the tool are effected as follows: the slit housing is guided into the seat of the chuck member; the bush 14 is then slipped on and the ring nut screwed to the stop position. The locating screw 19 must be positioned so that it is flush with the exterior diameter of the chuck member 1, this shows that the tool is adapted to be brought into its rearmost position. The tool is screwed in until it abuts against the point 7 and thus positions the tool in its rearmost position. In order to adjust the tool, the ring nut 23 — after releasing the locating screw 19 — is screwed to the required extent and the degree of displacement read on the scale. Locking is effected in the new position by tightly screwing the locating screw 19, this exerts as a reaction, axial pressure on the stop member 4. This pressure presses the cone of the resilient slit housing 10 into the cone of the bush 14 and thereby causes the slit housing to lock against the tool.

Various modifications may be made within the scope of the invention.

I claim:

1. In a self-adjusting tool chuck comprising a chuck member having means on one end adapted to be coaxially secured to a machine spindle, and an axial bore at the other end, a tool housing being axially slidably supported in said bore and having an internal threaded portion for receiving a tool, a stop member being axially adjustably supported in said bore and having means to cooperate with said tool housing for adjusting axial movements thereof, a locating screw radially adjustably mounted in said chuck member and engagable with the stop member for adjusting said stop member in the axial direction, a ring nut threadingly engagable with external threads on the chuck member, said ring nut cooperating with means on said chuck member for securing and releasing said tool housing in said chuck member; wherein the improvement comprises said locating screw having a frusto-conical bearing surface cooperating with an inclined bearing surface on the stop member for said axial adjustment of said stop member, said inclined bearing surface on the stop member extending at an acute angle to the center axis of the chuck member.

2. The tool chuck as claimed in claim 1, in which the inclined bearing surface of the stop member is formed at one end of a channel shaped groove with an arched section.

3. The tool chuck as claimed in claim 1, in which the ring nut is provided with an external scale to indicate the degree of displacement of the stop member from a datum position.

4. The tool chuck as claimed in claim 3, in which the scale is provided on an oblique front face of the ring nut.

5. The tool chuck as claimed in claim 1, in which the tool housing has longitudinal slits and an external cone-shaped end portion, said means for adjusting the axial position of said tool housing including a sleeve axially moveable on the chuck member and having an internal cone-shaped portion abutting the external cone-shaped portion of the tool housing, said sleeve having a radial flange cooperating with a radial flange on said ring nut to axially adjust said sleeve on the chuck member, and means securing the sleeve against rotation.

* * * * *